United States Patent Office 3,236,299
Patented Feb. 22, 1966

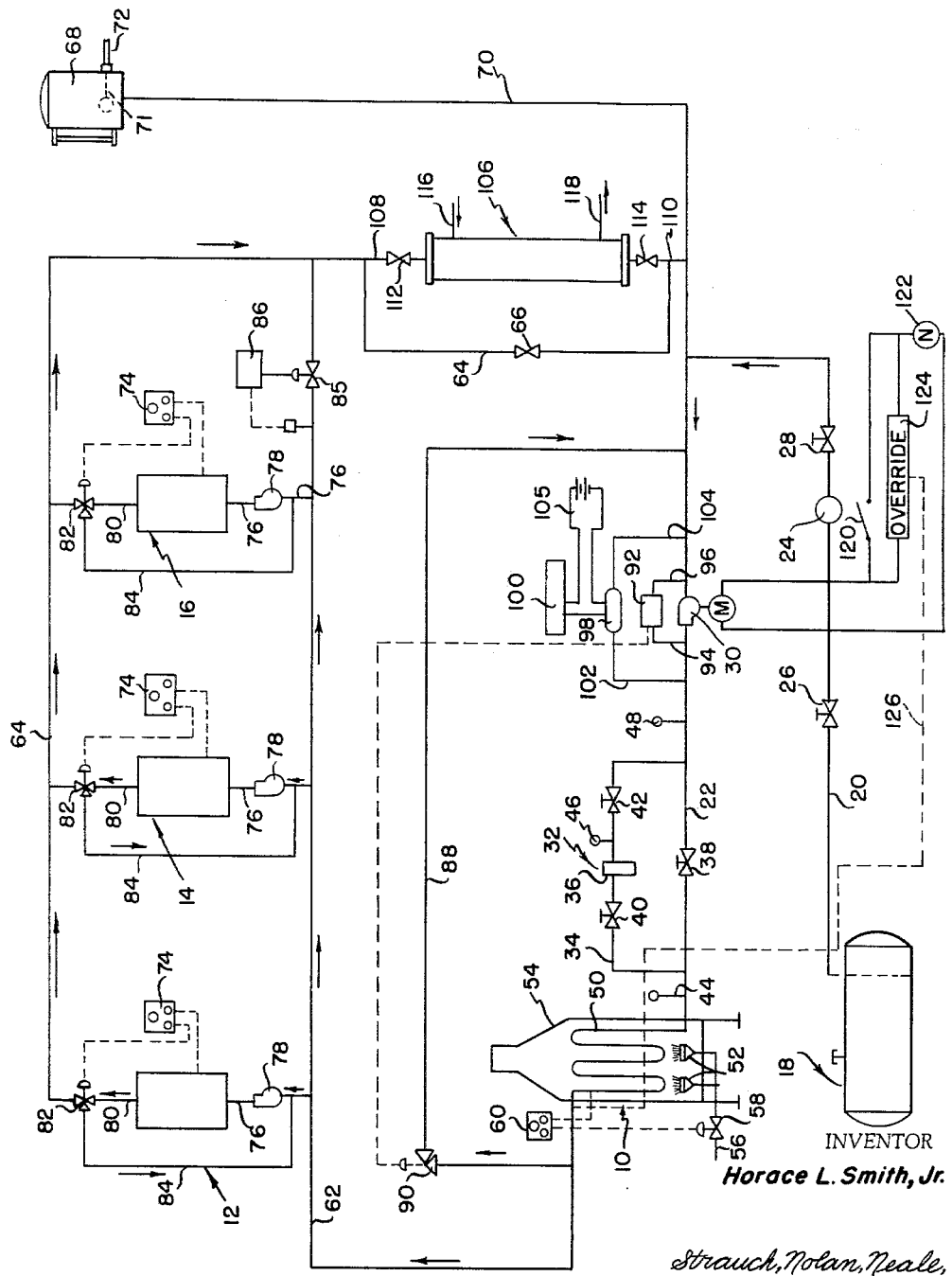

3,236,299
HIGH TEMPERATURE HEATING APPARATUS
Horace L. Smith, Jr., Richmond, Va., assignor to Hupp Corporation, Cleveland, Ohio, a corporation of Virginia
Original application Nov. 15, 1962, Ser. No. 237,817. Divided and this application Mar. 19, 1964, Ser. No. 357,002
4 Claims. (Cl. 165—134)

This application is a division of copending application No. 237,817 filed November 15, 1962, for high temperature heating apparatus.

This invention relates to heating apparatus for industrial processes. More specifically, it relates to apparatus for heating and circulating a non-aqueous heat transfer liquid at extremely high temperatures to enhance the efficiency of existing industrial processes by increasing the temperatures at which they are carried out and to make commercially feasible processes requiring a circulating medium heated to higher temperatures than has heretofore been practical.

One class of industrial process in which the heating apparatus provided by the present invention may be advantageously employed is the curing or heat setting of laminate plastic products. Such products are manufactured by stacking sheets or laminae of resin impregnated filler material such as glass fabric between the heated platens of a multi-platen press. The laminae are then compressed and heated to cure the resinous plastic binder. After the curing cycle is completed, the platens are cooled and the finished product removed from the press.

The present practice is to heat the presses in which such products are cured by circulating steam through the platens and to cool the presses following the curing cycle by circulating water through the platens. However, use of steam as the circulating heat transfer medium has severely limited the maximum temperatures attainable in the curing process, primarily because of the high temperatures and pressures involved. For example, at a temperature as low as 350° F., superheated steam has a vapor pressure of approximately 135 p.s.i.a. Therefore, if the minimum practical curing temperature of the selected resinous binder is 350° F., the entire heating system including the heating unit, the platens of the presses, the conduits through which the heat transfer medium flows, and other system components such as valves and the like must be designed to withstand pressures substantially above 135 p.s.i to provide an adequate safety factor. The cost of the heavy duty system components required to withstand pressures of this magnitude may well elevate the initial expense of the installation to a point such that the process is commercially unfeasible.

In order to alleviate the pressure problem, systems employing as circulating mediums non-aqueous liquids having boiling points above the boiling point of water have been proposed. Typical of the proposed systems are those disclosed in United States Patents Nos. 1,790,555 issued January 27, 1931, to C. C. Plumb for "Apparatus For Transmitting Heat"; 2,365,271 issued December 19, 1944, to L. Hornbostel for "Drier Drum"; 2,483,021 issued September 27, 1949, to O. O. Oaks for "Roll Heating and Cooling"; and 2,514,718 issued July 11, 1950, to O. O. Oaks for "Heating Mold." Each of these systems, however, had one or more of the following defects which rendered them commercially impractical:

(A) The necessity of using an expensive circulating liquid such as Dowtherm or tetra-aryl ortho silicates;

(B) The inability to supply circulating medium to a plurality of heat using units and to maintain these units at different temperatures;

(C) The lack of means for effecting continuous high velocity circulation through the heating unit to prevent overheating and consequent decomposition of the circulating liquid;

(D) The lack of means for quickly cooling the system upon shutdown to prevent residual heat in the heating unit from overheating the circulating liquid; and (E) Undue complexity resulting in impracticably high installation and maintenance costs.

Therefore, the present commercial processes are, in general, limited to employing as binders materials such as phenolic resins which can be cured at a satisfactorily rapid rate at temperatures of about 325° F.

It has long been recognized that a more homogenous laminate product having increased density, a more attractive appearance, and higher insulating value can be provided by employing silicon resins as binders. However, silicon resins have higher molecular weights than phenolic resins and therefore polymerize at temperature substantially above the commercially feasible 325–350° F. limit imposed by the presently available processing equipment.

The problems posed by the operating temperature limitations of currently available heating apparatus are encountered in the practice of many other industrial processes in addition to the exemplary process described above. For example, paper is normally dried by passing it over steam heated drums such as those shown in United States Patent No. 2,837,833 issued June 10, 1958, to E. A. Coudriet for "Roll Temperature Control System" or through a steam heated "Yankee" drier. For the reasons pointed out above, the maximum operating temperatures attainable in such devices is, at the present time, generally limited to about 325–350° F. However, it has long been known that paper could be manufactured more economically if it could be dried faster by raising the drying temperature.

Similarly, it is recognized that the curing of phenolic resin binders, which will polymerize at temperatures attainable by existing apparatus, can be carried out more efficiently by increasing the curing temperature and thereby the rate of the polymerization reaction.

In view of the present state of the art, it is one object of the present invention to increase the efficiency of existing industrial process employing a circulating heat transfer medium and to make commercially feasible industrial processes heretofore considered economically impractical by providing improved apparatus for heating and circulating a heat transfer medium through heat using units at temperatures substantially above the maximum temperatures attainable in currently available apparatus while maintaining the pressure of the circulating medium substantially lower than is possible by the present practice.

In essence, the novel heating apparatus provided by the present invention includes a unit for heating the circulating heat transfer medium, one or more using units through which the heated fluid is circulated, a system of conduits interconnecting the heating and using units, and other conventional system components such as circulating pumps, flow controlling devices, and the like.

One of the novel features of the present invention is that a liquid hydrocarbon having an extremely high boiling point is employed as the circulating heat transfer medium rather than superheated steam and water as in the presently available equipment of this general type. Such a medium may be heated to relatively high temperatures (550–800° F. or higher) without raising the vapor pressure above atmospheric. Expensive pressure insulated or otherwise specially constructed equipment will therefore be unnecessary even when operated at high temperatures.

As a result, the heating apparatus of the present invention is capable of circulating a heated medium to the using units at temperatures substantially higher than has heretofore been possible while, at the same time, employing system components designed to withstand lower pressures and therefore much less expensive than the components employed in the lower temperature prior art systems since the system only need be pressurized to the extent necessary to circulate the liquid through the system.

The use of a non-aqueous, liquid circulating medium also reduces to little or no consequence other economic considerations weighing against the use of superheated steam and water as the circulating heat transfer mediums in process heating apparatus of the type described above. First, steam superheated to temperatures on the order of 325–350° F. poses a substantial safety hazard and the heating system components must be over designed to ensure that they do not burst, further adding to the cost of the original installation. Second, the system components must be fabricated from expensive, corrosion resistant materials to prevent the circulating cooling water from unduly shortening their useful life.

One of the problems encountered in using a high boiling point hydrocarbon as a heat transfer medium is that, if it is overheated, it will react chemically, forming polymerized decomposition products of high molecular weight which increase the viscosity of the circulating liquid and, therefore, the expense of pumping it through the apparatus. Under such conditions, in time, a thick sludge will form in the heating system to such an extent that flow through the system will be entirely blocked, resulting in the burning through of heating unit tubes or other damage necessitating expensive repair and shutdown of the system.

Deleterious overheating can be prevented by maintaining a continuous high velocity circulation of the liquid through the heating unit where overheating most commonly occurs to decrease the thickness of the stagnate high temperature films adhering to the inner walls of the heating unit tubes. One system heretofore proposed for achieving continuous circulation is shown in United States Patent No. 2,100,671, issued November 30, 1937, to J. A. Reavell for "Liquid Circulation Heating System." The Reavell system, however, is a complicated collocation of flow circuits and pumps and would be too expensive, both in initial and maintenance costs, to be practical for many installations.

In the present invention constant circulation is effected by a single liquid circulating pump and a novel substantially simplified bypass circuit through which the circulating liquid is automatically diverted when flow velocity through the main flow circuit to the using units decreases. This circuit also allows the using units to be bypassed when the heating system is started up, permitting the circulating liquid to be quickly brought to operating temperature.

Normally the heating unit will be shut off and the flow of the circulating liquid through the using units terminated at approximately the same point of time so that the main circulating pump will cause the liquid to flow directly from the heating unit through the main supply line and return lines back into the heating unit. One type of heating unit which may be advantageously employed in this type of apparatus has a refractory lining which radiates substantial quantities of heat to the heating tubes after the burners are shut off. Since the flow through the using units is cut off and they are no longer extracting heat from the circulating liquid, the system, especially the heating unit, must be cooled as quickly as possible to prevent heat radiated from the refractory lining from overheating the circulating liquid. In the present invention this is accomplished by a novel flow circuit in which the circulating liquid flows through a cooling unit and then directly into the heating unit to rapidly reduce the temperature of the latter. After the temperature of the heating apparatus and the circulating fluid has been reduced, the circulating fluid may be diverted through the using units to cool the processed material.

As was pointed out above, the novel heating system provided by the present invention may include a plurality of using units. Another feature of the present invention is a novel zone arrangement in which each of the using units is located in a branch circuit having an independent circulator and controller permitting the temperature of the various users to be independently and accurately regulated. This arrangement permits more accurate control of the temperature in the various heat using units than can be achieved in the prior art zone type systems which employ but a single circulating pump, such as the system disclosed in United States Patent No. 2,495,126 issued January 17, 1950, to O. O. Oaks for "Oven," for example.

From the foregoing, it will be apparent that another object of the present invention is the provision of a novel closed system heating apparatus for circulating a liquid heat transfer medium at temperatures substantially above the poiling point of water but below the boiling point of the medium whereby high operating temperatures are achieved by pressures existant in the apparatus remain below about 50 p.s.i.g.

Another object of the present invention is the provision of novel heating apparatus in which corrosion of liquid contacted components is substantially eliminated.

A further object of the present invention is to provide improved heating apparatus for circulating a heat transfer medium at higher temperatures and at lower pressures than has heretofore been practical to enhance the efficiency and practicability of industrial processes and, simultaneously, to reduce the hazards attendant upon the bursting of a system component.

Another object of the present invention is the provision of apparatus for heating and circulating a decomposable heat transfer medium having novel means for effecting continuous high velocity circulation of the medium to prevent it from overheating.

A further object of the present invention resides in the provision of improved heating apparatus including a plurality of industrial processing units and novel means for independently varying the temperatures at which each of said processing units is maintained.

Another object of the present invention is the provision of apparatus for circulating a decomposable heat transfer medium including a heating unit and a novel circuit for cooling the medium and circulating it directly to the heating unit when the system is shut down to remove residual heat from the heating unit and prevent overheating of the medium.

It is another object of the present invention to provide apparatus for heating and circulating a heat transfer medium at a pressure substantially lower than in conventional systems and at substantially higher temperatures than in the latter, thereby increasing the effectiveness of such systems and, at the same time, reducing the initial installation cost.

It is a further object of the present invention to provide apparatus for curing laminate plastic products which makes practicable the use of silicon resins and other high molecular weight materials as binders.

Other objects and further novel features of the present invention will become fully apparent to those skilled in this art from the appended claims and as the ensuing detailed description and discussion of the preferred mode of carrying out this invention, proceeds in conjunction with the accompanying drawing, in which:

The single figure is a schematic view of a heating system incorporating the principles of the present invention.

Referring now to the drawing, the single figure illustrates an exemplary heating installation constructed in accordance with the principles of the present invention. In general, this novel system includes a heating unit 10, a plurality of using units 12, 14, and 16 and a novel closed system of flow conduits and controllers for circulating a heat transfer medium through the system. Using units 12, 14, and 16 may be paper drying drums or cans or multi-presses of the type disclosed in copending application No. 118,439 filed June 20, 1961 (now Patent No. 3,181,605), or any other desired type of heating equipment utilizing a circulating heat transfer medium.

One of the novel features of the present invention resides in employing a high boiling point hydrocarbon liquid as the circulating medium, permitting it to be circulated at extremely high temperatures in liquid form. Consequently, the using units may be heated to high temperatures and yet the system components need be designed to withstand only very low pressures. Preferred heat transfer liquids include Aroclor 1248 (a chlorinated biphenyl) and Isopropyl Santowax (a polyphenyl alkyl), which are produced by Monsanto Chemical Co., and XF1–0184 (an aryl oryloxysilone manufactured by Dow Chemical Company.) Aroclor 1248 liquid may be heated to temperatures on the order of 550–570° F. without boiling and without exceeding a permissive rate of decomposition. At 550° F. Aroclor 1248 has a decomposition rate of slightly less than 0.001% per hour of operation. Since a buildup of decomposition products of approximately 20% can be tolerated before pumping costs become excessive, the same liquid may be used for about three years without replacement (a system of the type to which the present invention relates normally operates on the order of 7000 hours per year.)

If the medium is to be heated to higher temperatures, Isopropyl Santowax, or XF1–0184 are employed. Isopropyl Santowax liquid can safely be heated to temperatures of about 700° F. At 700° F., this liquid has substantially the same rate of decomposition that Aroclor 1248 has at 550° F. XF1–0184 can be used at temperatures up to about 800° F. At 700° F. XF1–0184 has substantially the same rate of decomposition as Isopropyl Santowax at the same temperature.

The selected liquid is introduced into the closed circulating system from a storage tank 18 which is connected by conduit 20 to return conduit 22 of the main circulating system. A reversible pump 24 is interposed in conduit 20 to force the liquid into the return conduit and to return it to storage tank 18 if it becomes necessary to drain the system. Manual valves 26 and 28, connected in conduit 20 on opposite sides of pump 24, may be opened to allow the liquid to be pumped from storage tank 18 into the system and closed to prevent discharge of the liquid back into the storage tank after the system is filled. With valves 26 and 28 both closed, pump 24 is isolated from the circulating system and storage tank and may be removed for maintenance or replacement without affecting system operating or permitting discharge from storage tank 18.

The main circulating pump 30 interposed in return conduit 22 pumps the liquid through the return conduit 22 or a bypass circuit 32 into heating unit 10. Bypass circuit 32 includes a flow conduit 34, in which a filter 36 is interposed, and is employed when a new system is started up to remove scale, dirt, and other foreign material from the system. The manual valve 38 in main return conduit 22 is closed, diverting part or all of the circulating medium through conduit 34 and filter 36 until the system is clean. The manual valves 40 and 42 in the bypass conduit 34 are then closed and the manual valve 38 in main return conduit 22 opened, causing the circulating medium to bypass filter 36 and flow directly into heating unit 10. Manual valves 40 and 42 isolate filter 36 when both are closed, permitting it to be removed for cleaning or replacement without affecting system operation.

With valves 40 and 42 open and the valve 38 in main return conduit 22 closed to divert flow through the bypass circuit, pressure gages 44 and 46, connected to conduits 22 and 34, respectively, provide indications of the pressures on opposite sides of filter 36. As filter 36 becomes clogged with debris removed from the system, the pressure drop across it will increase. This will be readily apparent from the increasing differential between the readings of pressure gages 44 and 46, thus making it possible to readily ascertain the condition of the filter.

With the bypass circuit 32 isolated and vale 38 open, an indication of the pressure in the circulation system is furnished by a pressure gage 48 interposed in main return conduit 22 on the discharge side of the main circulating pump 30. Pressure gage 48 will provide a ready indication of conditions detrimental to circulation such as blockage of a flow conduit or the like.

The end of main return conduit 22 is connected to the inlet of heating unit 10 which is preferably of the shell and tube type. As illustrated, heating unit 10 includes sinuous heating tubes 50 (one of which is shown) through which the circulating medium flows and over which hot gases generated by combusition units 52 pass. Heating tubes 50 and one or more combustion units 52 are housed in an outer shell 54 of conventional construction which is preferably lined with an appropriate refractory (not shown) to radiate heat to heating tubes 50. The combustion units 52 may be either gas or oil burners or, if heating unit 10 is of larger capacity, may be coal fired.

Fuel flows to combustion units 52 through an inlet line 56 in which is interposed an automatically controlled valve 58. Valve 58 is preferably controlled by a conventional temperature responsive controller 60 responsive to the temperature of the circulating medium discharging from the heating tubes 50 in heating unit 10 to insure that the circulating medium discharged from the heating unit is invariably at the same temperature.

The outlets of heating tubes 50 are connected to the main supply conduit 62 through which the heated circulating medium flows to the heat using units 12, 14, and 16 or, if there is no demand for heat existing at any of these units, directly through conduit 64 and normally opened valve 66 into main return conduit 22.

An expansion tank 68 is connected into the circulating system at the junction of flow conduit 64 and main return conduit 22 by a branch conduit 70. Expansion tank 68 accommodates expansion of liquid in the closed system, preventing abnormal pressure conditions from bursting conduits or other system components, and maintains a gravity head on the system.

Incorporated in the expansion tank is a valve (not shown), operated by a float 71, which controls flow through an outlet line 72. If, under some abnormal operating condition, the level of the liquid in expansion tank 68 should rise abnormally, float 71 will open the valve, allowing excess liquid to be discharged through outlet 72 to prevent rupture or bursting of system components.

The three heat using units 12, 14, and 16 to which the heated liquid is circulated may be identical or, perhaps more commonly, may be different types of apparatus accomplishing successive steps in an industrial process or in a plurality of industrial processes.

Since the three heat using units 12, 14, and 16 may be different types of apparatus or, if the same type, may be performing different functions, it may be desirable, or even necessary, to operate them at different temperatures. For this reason, the three heat using units are connected in parallel to supply conduit 62 of the main circulating system and each is provided with an independent temperature controller 74. The heated circulating medium is diverted from supply conduit 62 into each of the heat using units 12, 14, and 16 through a branch supply conduit 76 by a branch circulating pump 78. The outlet or discharge end of each heat using unit is connected by a branch return conduit 80 to the return conduit 64 which leads to main return conduit 22.

Since control of the flow of the heated circulating medium through each of the heat using units 12, 14, and 16 is identical, such control will be described with reference to heat using unit 12 with the understanding that control of the flow through the other two heat using units is the same. As was indicated above, pump 78 diverts the heated circulating medium through branch inlet 76 into the heat using unit from which it is discharged through a branch return line 80 into conduit 64. Interposed in branch return conduit 80 is a three-way valve 82 controlled by the temperature controller 74, which is responsive to the temperature of the heating element (not shown) of heat using unit 12.

Temperature controller 74 may be set to maintain the temperature of the heat using unit heating element at any temperature below or substantially up to the temperature of the circulating medium. As the heating elements approach the temperature at which temperature controller 74 is set, valve 82 will be positioned to divert the circulating medium through a recirculation conduit such as the parallel branch conduit 84 connected between valve 82 and branch supply conduit 76 on the inlet side of branch pump 78. As long as the temperature of the heat using unit heating elements remain at the temperature at which controller 74 is set, branch pump 78 will circulate the heated heat transfer medium through branch inlet conduit 76 into the heat using unit 12, through branch discharge conduit 80, and branch conduit 84 back into the branch inlet conduit 76, continuously recirculating the same liquid and lowering its temperature. However, if the temperature of the heat using unit drops below the set temperature, temperature controller 74 will reposition valve 82, decreasing the flow through branch conduit 84 and increasing the flow through discharge conduit 80 into conduit 64. As a result, increased quantities of more highly heated liquid will be pumped from main supply conduit 62 into branch supply conduit 76 and into heat using unit 12, raising its temperature. As the heat using unit again approaches the set temperature, the circulating medium will once more be diverted into branch conduit 84, decreasing the proportion of highly heated liquid diverted from main supply conduit into the heat using unit.

It will readily be apparent that heat using units 12, 14, and 16 may have widely varying effects on the flow of the circulating medium in the main circulating system since, at any given time, none of the branch pumps 78 may be diverting the circulating medium from main supply conduit 62 or one, two, or all of the branch pumps may be pumping the medium from the main supply conduit into the heat using units 12, 14, and 16. Not withstanding this variation in demand, a reasonably constant high velocity flow, preferably on the order of about 8 feet per second, must be maintained through the main circulating system for, as was pointed out above, if constant circulation is not maintained, the medium in the heating tubes 50 of heater 10 will be overheated and will polymerize, forming a thick sludge which will adversely affect the performance of the system.

In order to maintain this flow substantially constant, a valve 85 is connected in main supply conduit 62 on the downstream side of the branch supply conduit 76 leading to heat using unit 16. Valve 85 is controlled by a pressure controller 86 responsive to the pressure in main supply conduit 62. Valve 85 functions as follows: if one or more of the heat using units drop below its set temperature, the circulating medium will be diverted by the appropriate branch pump 78 from main supply conduit 62 into the heat using unit where the demand for additional heat exists. This diversion of circulating medium from the main supply conduit will be detected by the sensing element of pressure controller 86 which will open valve 85 more widely, increasing the flow area through it to compensate for the diversion of circulating medium into the unit where the demand for additional heat exists. As the demand for additional heat by the heat using units 12, 14, and 16 is satisfied, less of the circulating medium will be diverted through the heat using units. This condition will be detected by pressure controller 86 which will decrease the flow area through valve 85 to compensate for the diminishing diversion of the circulating liquid to the heat using units. Thus, by taking advantage of the well known flow law that quantity of flow is directly proportional to the flow area and the pressure drop through a closed circulating system, pressure regulated valve 85 maintains substantially constant flow through the main circulating system.

Not withstanding the precautions taken to insure constant flow through the main circulating system, stoppage in the supply or branch conduits may occur, decreasing or even completely blocking flow through the main system, leading to overheating and polymerization of the circulating medium. To prevent a flow stoppage in the main circulating system from having this adverse effect, a novel bypass circuit arrangement, including a bypass conduit 88 connected between main supply conduit 62 adjacent the discharge end of heating unit 10 and main return conduit 22 on the inlet side of main circulating pump 30, is provided. Flow through bypass conduit 88 is controlled by a valve 90 which, in turn, is regulated by a differential pressure controller 92, the two bellows type sensing elements of which (not shown) are connected by leads 94 and 96 to the discharge and inlet sides of main circulating pump 30. Differential pressure controller 92, which may be of any conventional construction such as the Differential Pressuretrol manufactured by Minneapolis Honeywell Regulator Co. takes advantage of the well known fact that, if a constant differential is maintained between the suction and discharge pressures of a pump, the volume of liquid circulated by the pump will remain constant.

Therefore, should a condition arise tending to resist the flow through the system, the differential between the suction and discharge pressures will increase. In this circumstance, differential pressure controller 92 will open bypass valve 90, allowing the circulating medium to flow from main supply conduit 62 through bypass conduit 88 into main return conduit 22, maintaining the flow of liquid through heating unit 10 constant and thereby preventing the circulating medium from overheating.

When the resistance to the flow of fluid through the main circulating system is removed, the differential between the pump suction and discharge pressures will decrease. Differential pressure controller 92 will then close bypass valve 90, decreasing the flow of liquid through bypass conduit 88 and increasing the flow through the main circulating system.

Another important function is also served by the bypass arrangement just described. When the system is started up, it is preferable to bring the circulating medium to operating temperature as quickly as possible. In this circumstance, differential pressure controller 92 is set to open bypass valve 90 so that a substantial portion of the liquid in the circulating system will flow directly through bypass conduit 88 back into heating unit 10, quickly raising the circulating medium to operating temperature.

Cooperating with the novel bypass arrangement described above is an alarm system including a differential pressure switch 98 such as the CG45A,B pressure switch manufactured by Minneapolis-Honeywell Regulator Co., an alarm 100 which may be audible, such as a Klaxon, or visual, such as a warning light. The two diaphragm type sensing elements (not shown) of differential pressure switch 98 are connected by leads 102 and 104 to the discharge and suction sides, respectively, of main circulating pump 30. Differential pressure switch 98 may be set to close at substantially the same point at which differential pressure controller 92 begins to open bypass valve 90 to divert the circulating medium through bypass conduit 88. When differential pressure switch 98 closes it will energize alarm 100, providing a warning of the flow stoppage in the main circulating system.

Alarm 100 has an independent power source 105. Therefore, even though there is a power failure in the system supplying operating voltage to circulating pump 30, alarm 100 will be energized, providing a warning that the pump is no longer operating and that flow through the system has ceased.

The heating system described above is closed down by discontinuing the flow through heat using units 12, 14, and 16, and, at approximately the same point in time, discontinuing the flow of fuel to the combustion units 52 in heating unit 10. However, as was indicated above, the preferred form of heating unit employs a refractory lining which will continue to radiate substantial quantities of heat to the circulating medium. Since heat is no longer being extracted from the circulating medium by the heat using units, it is necessary to cool the medium as quickly as possible to prevent it from overheating.

For cooling the system, a heat exchanger 106, which is preferably of the shell and tube type, is connected in parallel with main circulating conduit 64 by inlet conduit 108 and an outlet conduit 110. When the system is shut down, the normally open valve 66 in main circulating system conduit 64 is closed and normally closed valves 112 and 114 interposed in the inlet and outlet conduits of the heat exchanger 106 circuit are opened, diverting the circulating medium from main supply conduit 62 through inlet conduit 108, heat exchanger 106, and outlet conduit 110 into main return conduit 22. In heat exchanger 106 the circulating medium is cooled by a cooling liquid, preferably cold water, which enters the heat exchanger through inlet conduit 116, circulates around the cooling tubes (not shown) through which the circulating medium travels, and is discharged from the heat exchanger through an outlet conduit 118. The cooled circulating medium flows directly from heat exchanger 106 through outlet line 110 and main return conduit 22 into heating unit 10, rapidly reducing the temperature of the circulating medium and the heating unit.

If desired, after the circulating medium has been reduced to a temperature where there is no danger of overheating, the circulating medium may be diverted to heat using units 12, 14, and 16 to cool the processed products in these units.

Finally, main circulating pump 30 is shut down. In the exemplary pump circuit illustrated, this accomplished by operating a switch 120 in the lead connecting the pump to power source 122. From the above description of the heating system it is apparent that, if switch 120 were opened before the system had sufficiently cooled, the liquid would cease to circulate and would be overheated by the residual heat in heating unit 10. To prevent such an occurrence, an override control 124 is connected in parallel with switch 120.

Override control 124, which may be of any of the numerous commercially available constructions such as the thermostatic switch manufactured by Fenwal, Inc., includes a temperature sensor (not shown) in contact with the liquid discharged from heating unit 54 and connected by a lead 126 to the control (lead 126 will be an electrical conductor if the temperature sensing element is a thermocouple, for example, or a liquid filled tube if the sensing element is of the expansible fluid type). Control 124 maintains the circuit to pump 30 complete until the temperature of liquid emerging from heating unit 10 is lowered to a point where the liquid will not be overheated if flow ceases. The override control 124 then interrupts the flow of operating current to pump 30 which stops.

If cooling of the processed products in the heat using units 12, 14, and 16 is desired, the override control 124 may be set to maintain pump 30 in operation until the cooling cycle is completed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a heating system employing a decomposable organic liquid as a circulating heat transfer medium:
  (a) a heating unit;
  (b) at least one heat using unit;
  (c) means including a supply line for supplying said liquid from said heating unit to said heat using unit;
  (d) means including a return line for returning said liquid from said using unit to said heating unit;
  (e) pumping means for circulating said liquid between said heating and heat using units;
  (f) a cooling unit connected in parallel with said return line;
  (g) selectively operable means for diverting the returning liquid from said return line through said cooling unit and directly into said heating unit to prevent residual heat in said heating unit from overheating and decomposing said liquid when said system is shut down; and
  (h) means responsive to the temperature of the liquid passed through said heating unit for maintaining said pump in operation until said liquids has cooled to a temperature at which overheating of the liquid will not occur if circulation ceases.

2. The heating system as defined in claim 1, including means for isolating said cooling unit from the circulating system to permit repair or replacement of said cooling unit without shutting down the heating system.

3. In a heating system employing a decomposable organic liquid as a circulating heat transfer medium:
  (a) a heating unit;
  (b) at least one heat using unit;
  (c) means including a supply line for circulating said liquid from said heating unit to said heat using unit;
  (d) means including a return line for returning said liquid from said using unit to said heating unit;
  (e) a cooling unit connected in parallel with said return line;
  (f) selectively operable means for diverting the returning liquid from said return line through said cooling unit and directly into said heating unit to prevent residual heat in said heating unit from overheating and decomposing said liquid when said system is shut down;
  (g) a pump for circulating said heat transfer medium through said system;
  (h) a source of operating voltage for said pump;
  (i) selectively operable means for interrupting the operating voltage during the system shutdown sequence to terminate the circulation of said medium through said system; and
  (j) means for overriding said selectively operable voltage interrupting means, said overriding means being responsive to the temperature of the circulating medium discharged from said heating unit and maintaining said circulating pump in operation until said heating unit has cooled to a temperature sufficiently low to prevent overheating of said liquid.

4. In a closed heating system:
  (a) a heating unit;
  (b) at least one heat using unit;
  (c) a circulating system comprising supply and return conduits connecting said heating unit and said heat using unit;
  (d) an organic liquid having a boiling point of several hundred degrees Fahrenheit in said system;
  (e) means for continuously maintaining a minimum rate of flow of the circulating organic heat transfer liquid through the heating unit to prevent the overheating and consequent decomposition of said liquid comprising a bypass conduit connected between the supply and return conduits ahead of the heat using unit or units and control means continuously and automatically responsive to a decreasing rate of flow of the circulating liquid medium through said closed circulating system to divert sufficient flowing medium from said supply conduit through the bypass conduit into the return conduit and through said heating unit to maintain said minimum rate of flow therethrough;

(f) means for effecting a substantially constant circulation of said liquid through said heating unit to prevent overheating and decomposition of said liquid; and (g) means for rapidly cooling said liquid upon shutdown of said system to prevent said liquid from being overheated by residual heat in said heating unit.

References Cited by the Examiner

UNITED STATES PATENTS 1,278,067    9/1918    Macdonald.
2,268,074   12/1941    Keller _____ 165—134 X JAMES W. WESTHAVER, *Primary Examiner.*